United States Patent
McCracken

(10) Patent No.: US 9,980,054 B2
(45) Date of Patent: May 22, 2018

(54) STEREOPHONIC FOCUSED HEARING

(71) Applicant: Acoustic Vision, LLC, Oklahoma City, OK (US)

(72) Inventor: O. Wendell McCracken, Pauls Valley, OK (US)

(73) Assignee: Acoustic Vision, LLC, Oklahoma City, OK (US)

( * ) Notice: Subject to any disclaimer, the term of this patent is extended or adjusted under 35 U.S.C. 154(b) by 67 days.

(21) Appl. No.: 14/988,526

(22) Filed: Jan. 5, 2016

(65) Prior Publication Data
US 2016/0157028 A1 Jun. 2, 2016

Related U.S. Application Data

(63) Continuation-in-part of application No. 14/849,032, filed on Sep. 9, 2015, now Pat. No. 9,470,910, which
(Continued)

(51) Int. Cl.
*H04R 25/00* (2006.01)
*G02C 7/02* (2006.01)
(Continued)

(52) U.S. Cl.
CPC ............. *H04R 25/405* (2013.01); *G02C 7/02* (2013.01); *G02C 11/06* (2013.01); *G02C 11/10* (2013.01);
(Continued)

(58) Field of Classification Search
CPC .. H04R 25/405; H04R 19/005; H04R 19/016; H04R 25/604; H04R 17/025;
(Continued)

(56) References Cited

U.S. PATENT DOCUMENTS 2,896,024 A * 7/1959 Toomey ................. G02C 11/06
381/23.1
3,770,911 A 11/1973 Knowles et al.
(Continued)

FOREIGN PATENT DOCUMENTS

| WO | WO2002/48659 | 6/2002 |
| WO | WO2009/156145 | 12/2009 |
| WO | WO2011/130374 | 10/2011 |

OTHER PUBLICATIONS

Lo, et al. Parylene-based electret power generators; Department of Electrical Engineering, J. Micromech. Microeng. vol. 18; 2008; pp. 1-8.

*Primary Examiner* — Oyesola C Ojo

(57) ABSTRACT

Eyewear for enhanced hearing includes a first sound detector positioned on or adjacent a first lens of the eyewear, and a second sound detector positioned on or adjacent a second lens of the eyewear. A processing unit positioned on the eyewear is in communication with the first and second sound detectors. The processing unit utilizes software that includes instructions for determining a time differential between detection of a sound by the first sound detector and detection of the same sound by the second sound detector. Because the time differential is proportional to the angular displacement of the sound from directly in front of the eyewear or person wearing the eyewear, sound signals corresponding to detected sounds having an angular displacement less than a stored maximum angular displacement value can be preferentially enhanced and transmitted via a data transmission module to a hearing aid device.

12 Claims, 3 Drawing Sheets

Related U.S. Application Data is a continuation of application No. 13/768,894, filed on Feb. 15, 2013, now Pat. No. 9,161,113.

(60) Provisional application No. 62/099,632, filed on Jan. 5, 2015, provisional application No. 61/600,236, filed on Feb. 17, 2012, provisional application No. 61/624,585, filed on Apr. 16, 2012.

(51) Int. Cl.
| | | |
|---|---|---|
| *G02C 11/06* | (2006.01) | |
| *G02C 11/00* | (2006.01) | |
| *H04R 1/02* | (2006.01) | |
| *H04R 19/00* | (2006.01) | |
| *H04R 19/01* | (2006.01) | |

(52) U.S. Cl.
CPC .......... *G02C 2202/16* (2013.01); *H04R 1/028* (2013.01); *H04R 19/005* (2013.01); *H04R 19/016* (2013.01); *H04R 25/552* (2013.01); *H04R 25/554* (2013.01); *H04R 2205/041* (2013.01)

(58) Field of Classification Search
CPC ............... H04R 1/028; H04R 2225/51; H04R 2499/11; H04R 2225/31; H04R 17/02; H04R 2205/041; H04R 25/552; G02C 7/02; G02C 11/10; G02C 11/06; G02C 2202/16

See application file for complete search history.

(56) References Cited

U.S. PATENT DOCUMENTS

| | | | |
|---|---|---|---|
| 3,789,163 A | 1/1974 | Dunlavy | |
| 3,947,644 A | 3/1976 | Uchikawa | |
| 4,250,415 A | 2/1981 | Lewiner et al. | |
| 4,773,095 A * | 9/1988 | Zwicker | H04R 1/406 |
| | | | 381/313 |
| 5,434,924 A * | 7/1995 | Jampolsky | H04R 25/502 |
| | | | 381/17 |
| 6,069,963 A * | 5/2000 | Martin | H04R 25/405 |
| | | | 381/313 |
| 6,091,546 A * | 7/2000 | Spitzer | G02B 27/017 |
| | | | 345/8 |
| 6,427,017 B1 | 7/2002 | Toki | |
| 6,785,393 B2 | 8/2004 | Lipponen | |
| 7,388,619 B2 | 6/2008 | Eaton | |
| 7,527,375 B2 | 5/2009 | Blum et al. | |
| 7,555,136 B2 * | 6/2009 | Wang | G02C 11/06 |
| | | | 381/151 |
| 7,609,842 B2 * | 10/2009 | Sipkema | G02C 11/06 |
| | | | 381/313 |
| 7,760,898 B2 * | 7/2010 | Howell | G02C 5/001 |
| | | | 381/322 |
| 7,971,994 B2 | 7/2011 | Blum et al. | |
| 7,995,777 B2 | 8/2011 | Yu et al. | |
| 8,139,801 B2 * | 3/2012 | Sipkema | H04R 25/405 |
| | | | 381/313 |
| 9,380,374 B2 * | 6/2016 | Sprague | G10L 13/043 |
| 2002/0080684 A1 * | 6/2002 | Donskoy | B06B 1/0292 |
| | | | 367/140 |
| 2004/0136541 A1 * | 7/2004 | Hamacher | H04R 25/70 |
| | | | 381/60 |
| 2007/0053522 A1 * | 3/2007 | Murray | H04R 1/406 |
| | | | 381/71.6 |
| 2007/0160254 A1 * | 7/2007 | Ritter | G02C 11/06 |
| | | | 381/381 |
| 2008/0260189 A1 * | 10/2008 | Schobben | H04R 25/405 |
| | | | 381/313 |
| 2010/0034404 A1 * | 2/2010 | Dent | H04R 5/02 |
| | | | 381/310 |
| 2010/0110368 A1 | 5/2010 | Chaum | |
| 2010/0224437 A1 | 9/2010 | Booth | |
| 2011/0091057 A1 * | 4/2011 | Derkx | H04R 25/407 |
| | | | 381/313 |
| 2011/0182443 A1 | 7/2011 | Gant | |
| 2011/0249230 A1 * | 10/2011 | Blum | G02C 7/083 |
| | | | 351/47 |
| 2012/0047953 A1 | 3/2012 | Feng | |
| 2012/0162259 A1 * | 6/2012 | Sakai | G01S 3/8083 |
| | | | 345/634 |
| 2012/0165597 A1 | 6/2012 | Proulx | |
| 2012/0282976 A1 * | 11/2012 | Suhami | G10K 11/1786 |
| | | | 455/556.1 |

\* cited by examiner

STEREOPHONIC FOCUSED HEARING

CROSS REFERENCE TO RELATED APPLICATIONS AND INCORPORATION BY REFERENCE STATEMENT

This application claims priority to U.S. Provisional Application No. 62/099,632 filed on Jan. 5, 2015, which is hereby expressly incorporated herein by reference in its entirety. This application is also a continuation-in-part of U.S. application Ser. No. 14/849,032 filed Sep. 9, 2015, which is a continuation of U.S. application Ser. No. 13/768,894 filed Feb. 15, 2013, now U.S. Pat. No. 9,161,113, which claims priority to U.S. Provisional Patent Application No. 61/600,236, filed Feb. 17, 2012, and U.S. Provisional Patent Application No. 61/624,585, filed Apr. 16, 2012. The entire contents of each are hereby expressly incorporated herein by reference.

BACKGROUND OF THE INVENTIVE CONCEPTS

1. Field of the Inventive Concepts

The inventive concepts disclosed and claimed herein relate generally to a system for hearing aids, and more particularly, but not by way of limitation, to a hearing aid system that will enhance sounds in front of the user while at the same time, optionally suppress sounds received from other directions.

2. Brief Description of Related Art

Hearing aids are electroacoustic devices used to amplify or modify sound for the user. They are typically worn in or behind the ear and include a microphone, an amplifier, and a speaker. The microphone receives sound waves and converts the sound to electrical signals. The electrical signals can then be amplified or otherwise processed to amplify certain frequencies while reducing or cancelling others. The amplified/processed electrical signals are then converted back to sound waves which are transmitted to an ear canal and/or the ear drum of the user. Other hearing aid devices transmit the amplified/processed electrical signals to a transducer that converts the signals into mechanical vibrations directly on the tympanic members of the middle ear. Bone anchored hearing aids (BAHA) bypass the outer and middle ear and vibrate the skull and inner ear directly.

Regardless of the final delivery means, all hearing aids require a microphone. Due to problems associated with hearing aid size and weight, and for cosmetic reasons, much effort has been expended to decrease the size of these microphones. Thus, the area of sound energy intercepted is small and the small microphone is necessarily very sensitive. The smaller size has worsened problems associated with reception of confusing, unwanted sounds surrounding the listener. The overall hearing aid performance is often further limited by the proximity of the speaker (in the listener's ear) to the microphone of the hearing aid. This gives rise to disruptive feedback such as oscillation or whistling.

What is needed is a hearing system or hearing aid system that will maximize the desired acoustic input that comes to the hearer from a space in front of the hearer and minimize the undesired acoustic input from other directions.

SUMMARY OF THE INVENTIVE CONCEPTS

The inventive concepts disclosed and claimed herein generally relate to a device and method for improved hearing. In one embodiment, eyewear includes a first sound detector positioned on or adjacent a first lens of the eyewear, and a second sound detector positioned on or adjacent a second lens of the eyewear. A processing unit positioned on the eyewear is in communication with the first and second sound detectors. The processing unit utilizes software that includes instructions for determining a time differential between detection of a sound by the first sound detector and detection of the same sound by the second sound detector.

In another embodiment, eyewear includes a first array of at least two sound detectors positioned on or adjacent a first lens of the eyewear, and a second array of at least two sound detectors positioned on or adjacent a second lens of the eyewear. A processing unit is positioned on the eyewear for receiving detected sound signals from the first and second arrays of sound detectors and determining an angular displacement and distance of the detected sound from the eyewear. The processor is programed to modify the amplitude of the sound signals based on stored values for maximum angular displacement and distance, and to output the modified sound signals to a hearing aid device.

In yet another embodiment, a system for enhanced hearing includes eyewear in communication with a hearing aid. The eyewear includes a first sound detector positioned on or adjacent a first lens of the eyewear and a second sound detector positioned on or adjacent a second lens of the eyewear. The hearing aid includes a processing unit in communication with the first and second sound detectors and storing software that includes instructions that when executed by the processing unit causes the processing unit to determine a time differential between detection of a sound by the first sound detector and detection of the same sound by the second sound detector. The software further causes the processor to modify the amplitude of the sound signals corresponding to the sound based on a stored value for maximum time differential. The stored time displacement value is used to determine if the sound received should be amplified or should be dampened. The modified sound signals are transmitted to hearing aid transducer for delivery of sound to a wearer's ears.

BRIEF DESCRIPTION OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, and drawings. The figures are not necessarily to scale and certain features and certain views of the figures may be shown exaggerated, to scale or in schematic in the interest of clarity and conciseness. In the drawings.

DETAILED DESCRIPTION OF EXEMPLARY EMBODIMENTS

Figure 1:
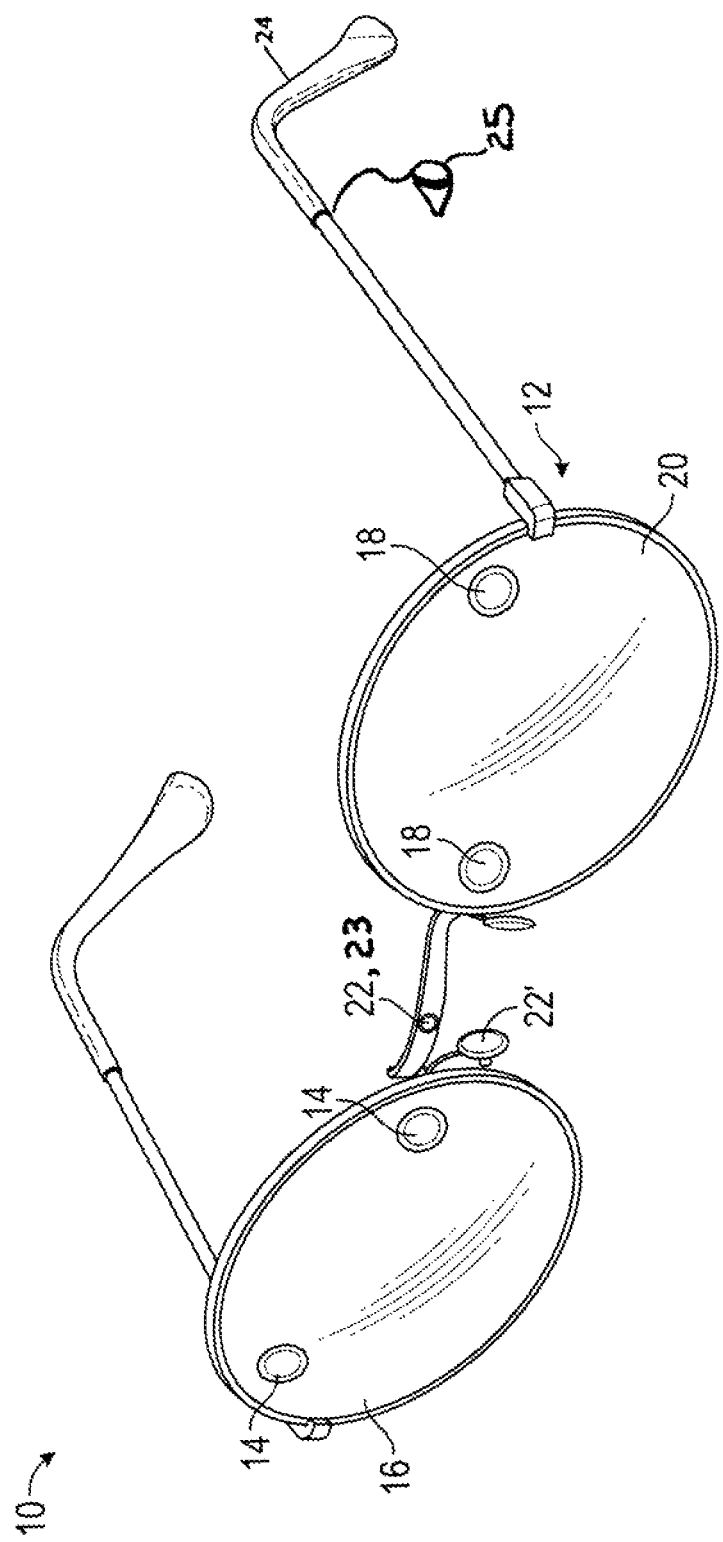
FIG. 1 is an elevational view of one embodiment of a system for enhanced hearing constructed in accordance with the presently disclosed inventive concepts.

Before explaining at least one embodiment of the inventive concept disclosed herein in detail, it is to be understood that the inventive concepts are not limited in application to the details of construction, experiments, exemplary data, and/or the arrangement of the components set forth in the following description, or illustrated in the drawings. The presently disclosed and claimed inventive concepts are capable of other embodiments or of being practiced or carried out in various ways. Also, it is to be understood that the phraseology and terminology employed herein is for purpose of description only and should not be regarded as limiting in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless it is obvious that it is meant otherwise.

Finally, as used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Disclosed herein are devices and systems for listening primarily to sounds coming from a frontal direction and this concept is called "focused hearing" herein. Focused hearing is thus used to denote the enhancement of sounds in front of the hearer while, at the same time, relatively suppressing sounds received from other directions.

Referring now to the drawings, and more specifically to FIG. 1, shown therein is an exemplary embodiment of a system for enhanced hearing 10 constructed in accordance with the inventive concepts disclosed and claimed herein. In this embodiment the system for enhanced hearing 10 includes eyewear 12 having a first sound detector 14 on or adjacent a first lens 16, and a second sound detector 18 on or adjacent a second lens 20. A processing unit 22 is positioned on the eyewear 12 and is in communication with the first and second sound detectors 14 and 18, respectively. The processing unit 22 utilizes software that includes instructions for determining a time differential between detection of a sound by the first sound detector 14 and detection of the same sound by the second sound detector 18.

Nonlimiting examples of suitable sound detectors include microphones, electret condenser microphones, accelerometers, and transparent lens microphones such as those described in U.S. Pat. No. 9,161,113, the content of which is incorporated in its entirety herein by reference. The accelerometers and microphones can utilize micro-electro-mechanical systems (MEMS) and can be present singly, one on or adjacent each lens, or as an array of two or more on or adjacent each lens.

In one embodiment, a microphone is attached on or adjacent each of the eyewear lenses to allow acoustic energy to strike the active portion of the microphones. The resulting signals are communicated by wire or wirelessly to the processing unit. In another embodiment, accelerometers or vibration detectors are attached to the eyewear lenses, one or more to each, to detect the lens vibrations due to sound and transform the vibrations into electrical signals which can then be delivered via wire or wirelessly to the processing unit or directly to a hearing aid. Further transmission can be via BLUETOOTH® or other RF signal.

In one embodiment, the accelerometers utilize micro-electro-mechanical systems (MEMS) and the MEMS microphones detect the lens vibrations. Like the accelerometer, these can be single or multiple microphones per lens. MEMS microphones are available from, for example, Knowles Corporation. Acoustics and electronics groups are designing accelerometers and microphones of ever-smaller sizes and varying mounting options. One or more of these can be used to detect and conduct sound signals to the microelectronics which might be placed in the nose pad of the eyeglasses. If it is desirable to utilize more than one such transducer or accelerometer, the resulting multiple signals can be processed in a signal processor before transmission to the hearing aids.

The terms "processor," "signal processor" and "processing unit" as used herein may include a single processor or multiple processors working independently and/or together to execute the logic described herein. The processing unit 22 is positioned on the eyewear 20 and therefore in close proximity to the sound detectors 14 and 18. For example, the processing unit 20 can be positioned within the eyewear frame, on the bridge of the eyewear, or within a nose pad 22' of the eyewear.

The processing unit 22 utilizes sound recognition software to identify the "same" sound at each microphone. For example, the processing unit 22 can utilize syllable recognition software and voice type characterization software as well as triangle solution software. Such software is well known to those skilled in the art. The processing unit 22 includes a data transmission module 23 to communicate the measured time displacement of same sounds to a hearing aid device 25 with its own processor which will directionally enhance the sounds having a time displacement less than a set point ("frontal sounds") which can be predetermined by the user. This enhancement can be as simple as an amplification of the frontal sounds and possible diminishment of the non-frontal sounds. The enhancement can also utilize present and future hearing aid technology specific to the user's needs.

In another embodiment, the processing unit 22 includes the entire sound enhancement necessary to transmit the final sound in a wired or wireless fashion to a speaker(s). Suitable speaker(s) can include those presently known in the art and utilized in hearing aid devices. Sound can also be transmitted to the user via bone vibration using the ear piece or lanyard 24 of the eyewear 20.

Figure 2:
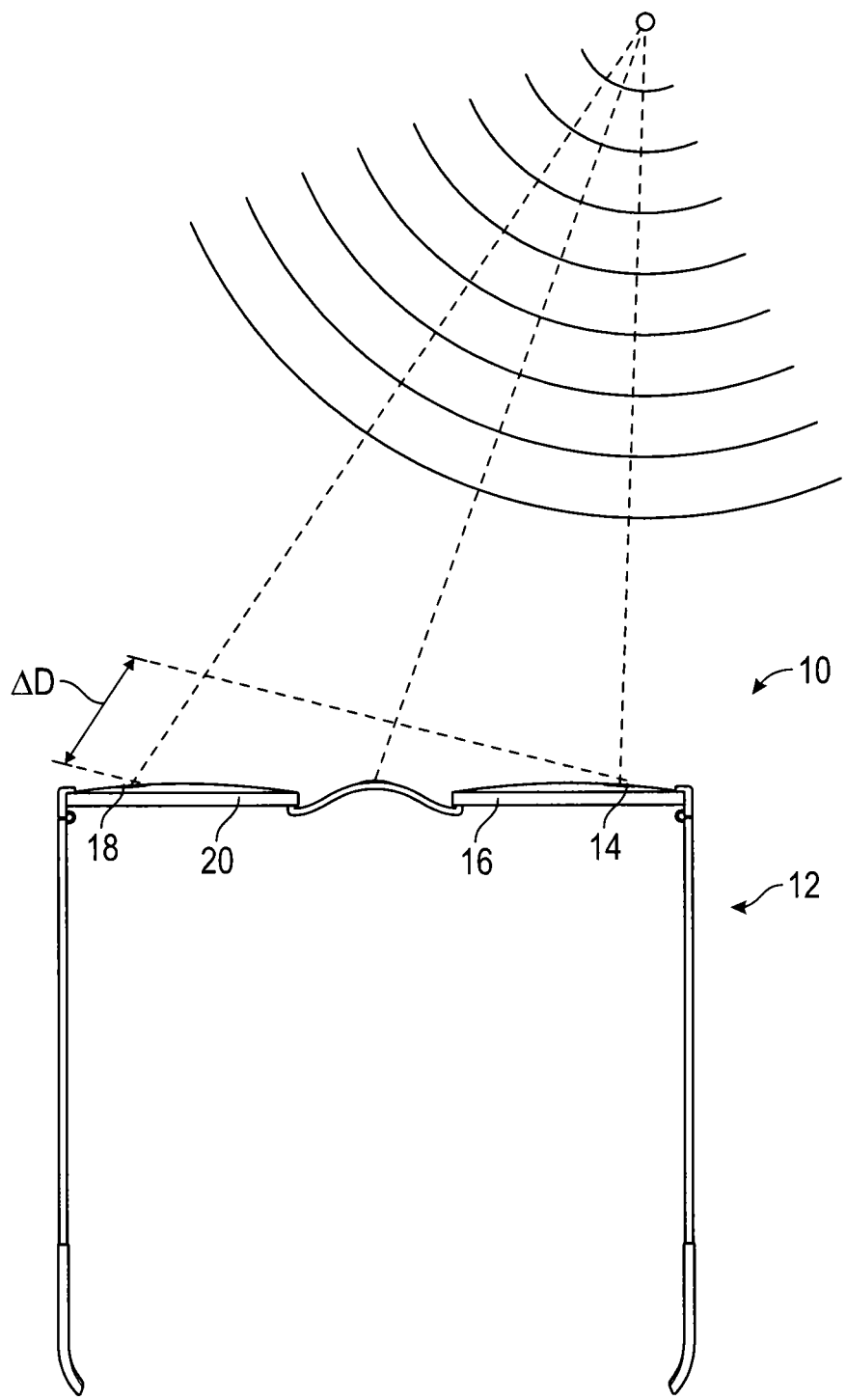
FIG. 2 is an elevational view of an embodiment of a system for enhanced hearing showing sound reaching a sound detector on a first lens before reaching a sound detector on a second lens.

Focused hearing is achieved by identifying those sounds received from an adjustable horizontally oriented space, in front of the hearer or listener, and causing those sounds to be enhanced compared to sounds received from outside the space. First, consider a stereophonic microphone pair located in front of the wearer or listener which detects a sound signal coming from directly in front of the microphone pair. It is apparent that the sound signal energy will arrive at both microphones at the same instant. Now consider the same microphone pair detecting a sound signal from 30° to the right of the hearer such as in FIG. 2. It is apparent in this case that the second sound signal energy will impact the right microphone before it impacts the left microphone because of the difference in the path length. The difference in the times of arrival at the two microphones can be used to determine the angular displacement from a forward direction that the sound energy came from, and that displacement can then be used to determine whether to strengthen or weaken the resulting sound at the listener's ear.

The processor 20 can examine each digital word that is generated by analog to digital conversion of the two microphone reception signals. By comparing the arrival times of the two, the processor can adjust the digital words to be louder or softer as directed by the user control. This can be achieved since the frontal sound signals at the two microphones are identical but slightly displaced in time from each other, allowing the processor to identify and classify the signals which are to be amplified or suppressed.

Placement of sound detectors on or adjacent each of the two lenses in eyewear provides the necessary separation and direction. In addition, the frames of the eyewear, particularly the temple pieces, are very close to the wearer's ear such that the focused sounds can be readily delivered to the wearer's hearing aid devices located at each ear in a wired or wireless fashion, such as via conductors or any suitable wireless communication protocol such as a protocol within the IEEE 802.11 family, a protocol known in the art as BLUETOOTH®, or a cellular telephone protocol, for example.

It should be noted that the accuracy of such a system is achieved by having two, horizontally displaced sound detectors intercepting sound from in front of the listener's face. Thus, any headwear could be modified to include the first and second sound detectors 14 and 18, respectively and the processing unit 22 in wired or wireless communication with the first and second sound detectors 14 and 18, respectively. For example, suitable headwear can comprise eyewear, a hat, a head band, and the like.

The focused hearing is achieved by maximizing the acoustic input which comes to the hearer from within the frontal zone and to diminish the acoustic input coming from outside the same frontal zone, where the zone is an imaginary spatial zone lying with a horizontal orientation directly in front of the wearer's glasses. The physics principles utilized to accomplish the hearing focus are the speed of sound in air and the physical horizontal spacing of at least two receiving means located at or near the two lenses in front of the wearer's eyes.

Figure 3:
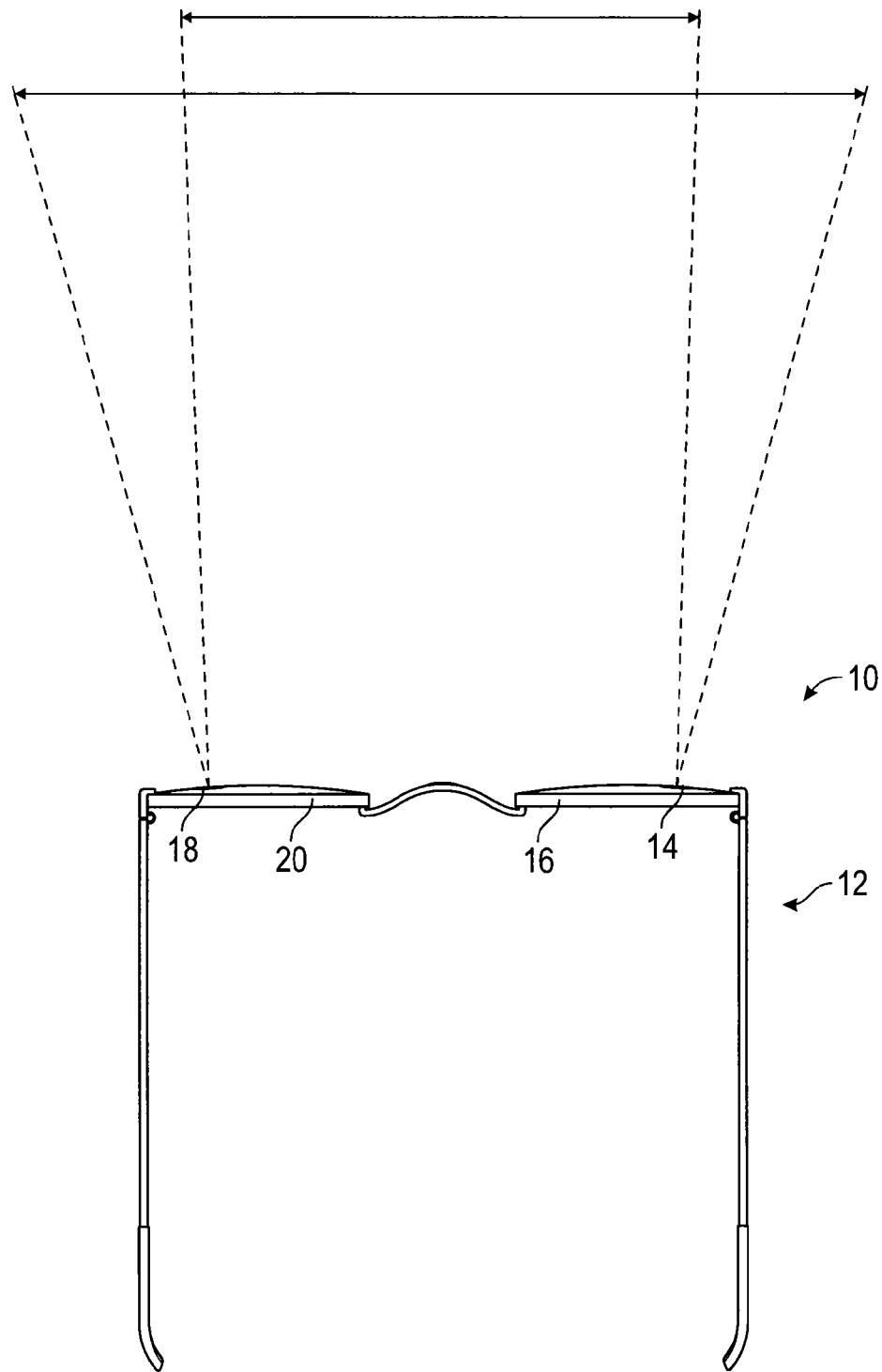
FIG. 3 is an elevational view of an embodiment of a system for enhanced hearing showing two frontal zones differing in horizontal angular position from vertical plane perpendicular to the plane of the lenses.

For example, the relative times of arrival of sound at the two sound detectors can be determined and preserved through the analog to digital conversion of the acoustic signals. The processor 22 then makes a comparison to determine if the differential time of acoustic arrivals is within or outside of the differential time defined by the user. FIG. 3 shows how changing a differential time set point can change the horizontal angular position and thus the frontal zone of sounds to be enhance. These differential times can be defined via remote control while the user is selecting the directional qualities desired. Those digital words from the analog to digital conversion that are thus identified as representing sounds arriving within the differential time selected by the user, are then modified to represent a louder sound so that when these digital words undergo subsequent digital to analog conversion the resulting analog signal is presented to the hearer via an electronic speaker and those identified sounds are enhanced to the hearer relative to sounds coming from outside the frontal zone. The degree of amplification to the electronic speaker is under the control of the user, giving the user control of sound suppression of those sounds arriving from outside the frontal come.

It should be noted that the accuracy of such a system is achieved by having two, horizontally displaced sound detectors intercepting sound from in front of the listener's face. Thus, any headwear could be modified to include the first and second sound detectors 14 and 18, respectively and the processing unit 22 in wired or wireless communication with the first and second sound detectors 14 and 18, respectively. For example, suitable headwear can comprise eyewear, a hat, a head band, and the like.

In one embodiment, the processor 20 is programmed to follow the directions of a wearer or user and give the user the customization that he or she needs to screen out unwanted disruptive side sounds, while giving amplification to the sounds in his or her frontal view. The parameters of the system for enhanced hearing 10, loudness, side suppression, and angle, can be adjustable and selected by the user in an ongoing manner by placing these adjustments under the control of a remotely connected device utilizing, for example, the BLUETOOTH® technology.

When a wireless connection is utilized for user customization, communication can include a computing device or smart device such as a cell phone or notepad which can be used to set or modify the field of hearing desired by the user. The computing device can be implemented as a personal computer, a smart phone, a network-capable TV set, TV set-top box, a tablet, an e-book reader, a laptop computer, a desktop computer, a network-capable handheld device, a video game console, a server, and combinations thereof, for example. Preferably the computing device comprises an input device, an output device, and computer hardware. The computer hardware may be a system or systems that are able to embody and/or execute the logic of the processes described herein. Logic embodied in the form of software instructions and/or firmware may be executed on any appropriate hardware. For example, logic embodied in the form of software instructions or firmware may be executed on a dedicated system or systems, or on a personal computer system, or on a distributed processing computer system, and/or the like. In some embodiments, logic may be implemented in a stand-alone environment operating on a single computer system and/or logic may be implemented in a networked environment, such as a distributed system using multiple computers and/or processors.

In one embodiment, remote control of the maximum time differential is achieved with a smartphone. This allows the user to select the desired frontal space width, or zone, and loudness for a restaurant setting or a hunting mode or anything between as is needed.

In one embodiment, the processor 22 includes translation software for both foreign and native speech and allows translated conversation and announcements to be heard in the user's native language.

In another embodiment, motion transducers such as accelerometers with associated software allow the pointing direction of the user's head relative to each member of a conversation group to be stored in short term memory. The processor 22 can thus be adaptive to the user's needs by short term learning of head movement responses to sounds and angular pointing of the head in response to sounds as determined by triangulation within the sound field.

EXAMPLE 1

A signal processor is programmed to enhance the hearing experience of the user by using the following signal characteristics. The first characteristics of the acoustic sound signal is its velocity in air which is about 1100 ft./s. Assuming a 0° reference to be directly in front of the wearer, the wearer's looking direction, and considering a signal whose origin is N degrees to the right of the wearer, the resulting detection of the assumed signal would happen at the two lenses spaced apart in time because the signal path to the right lens would be shorter than the left lens signal path. This difference, when presented to the human hearing system, gives the wearer the angular deviation from straight-ahead. In a signal processor the signal from N degrees to the right can be identified since it is the same in each lens only displaced in time of arrival, and the angular displacement from 0° of the signal source can be calculated.

The processor uses triangulation methods known to those in the art to determine the horizontal angular position from 0° and is programmable to enhance signals arriving from within a certain horizontal angular position from 0° and at the same time diminish signals from outside this horizontal angular position. Further, the processor can do this under program controls such that the frontal horizontal angular enhancement can be controlled by the wearer and can thus achieve acoustic zoom. This is possible because the wanted sounds can be selectively enhanced and the side sounds diminished while the angle of reception and amount of enhancement of the frontal sound is under control of the wearer. The eyeglass instrument can thus become the equivalent of an acoustic binocular.

EXAMPLE 2

A further triangulation method allows depth perception of sounds. The distance measurement is based on utilizing two sound transducers at each eyewear lens and using a time of arrival difference measurement to solve two resulting triangles, one for each side of the eyewear. The solution of two oblique triangles is possible because the length of one side of the triangle is known, i.e., the distance between the transducers. The difference in length of the two remaining sides is determined by measuring the slight difference in time of arrival of two identical syllables at the two transduces for each side. Using the above triangle definition, the processor will find the resulting triangle and determine the angle from forward of the origin of that syllable. The distance from the viewer will then calculated by the solution of a third triangle formed by the lines extending from the center of each lens, right and left, at their respective angles from forward. The solution of this third triangle depends on the known separation of the two lens centers and the angle determined in the triangle solution of angular displacement from forward of the viewer. The definition of this third triangle yields the syllable origin distance from the viewer and can allow sound discrimination based on distance.

From the above description, it is clear that the inventive concept(s) disclosed herein is well adapted to carry out the objects and to attain the advantages mentioned herein as well as those inherent in the inventive concept disclosed herein. While exemplary embodiments of the inventive concept disclosed herein have been described for purposes of this disclosure, it will be understood that numerous changes may be made which will readily suggest themselves to those skilled in the art and which are accomplished without departing from the scope of the inventive concept disclosed herein and defined by the appended claims.

What is claimed is:

1. Eyewear comprising:
   a first sound detector positioned on or adjacent a first lens of the eyewear;
   a second sound detector positioned on or adjacent a second lens of the eyewear; and
   a processing unit positioned on the eyewear, in communication with the first and second sound detectors, and storing software that includes instructions that when executed by the processing unit causes the processing unit to determine a time differential between detection of a sound by the first sound detector and detection of the same sound by the second sound detector, and from the time differential determine an angular displacement from a forward direction for each detected sound, amplify each sound signal corresponding to the detected sound for which the determined angular displacement is less than a stored angular displacement value, diminish each sound signal corresponding to the detected sound for which the determined angular displacement is greater than the stored angular displacement value, and transmit the amplified and diminished sound signals via a data transmission module to a hearing aid device.

2. The eyewear of claim 1, wherein the first and second sound detectors each comprise a microphone.

3. The eyewear of claim 1, wherein the first and second sound detectors each comprise an electret condenser microphone.

4. The eyewear of claim 1, wherein the first and second sound detectors each comprise a transparent lens microphone.

5. The eyewear of claim 1, wherein the first and second sound detectors each comprise a micro-electro-mechanical systems microphone.

6. Eyewear comprising:
   a first sound detector positioned on or adjacent a first lens of the eyewear;
   a second sound detector positioned on or adjacent a second lens of the eyewear; and
   a processing unit positioned on the eyewear, in communication with the first and second sound detectors, and storing software that includes instructions that when executed by the processing unit causes the processing unit to determine a time differential between detection of a sound by the first sound detector and detection of the same sound by the second sound detector, amplify each sound signal corresponding to the detected sound for which the time differential is less than a stored time differential value, diminish each sound signal corresponding to the detected sound for which the determined time differential is greater than the stored time differential value, and transmit the amplified and diminished sound signals via a data transmission module to a hearing aid device.

7. Eyewear comprising:
   a first array of at least two sound detectors positioned on or adjacent a first lens of the eyewear;
   a second array of at least two sound detectors positioned on or adjacent a second lens of the eyewear; and
   a processing unit positioned on the eyewear receiving detected sound signals from the first and second arrays of sound detectors, and storing software that includes instructions that when executed by the processing unit causes the processing unit to determine an angular displacement from a forward direction and a distance from the eyewear for each detected sound, to modify the amplitude of the sound signals corresponding to each detected sound based on stored values for maximum angular displacement and distance, and to output the modified sound signals to a hearing aid device.

8. The eyewear of claim 7, further including a data transmission module, and wherein the software further includes instructions that when executed by the processing unit cause the processing unit to amplify sound signals corresponding to sounds having an angular displacement and a distance less than stored values of angular displacement and distance, and to transmit the amplified sound signals via the data transmission module to the hearing aid device.

9. The eyewear of claim 8, wherein the software further includes instructions that when executed by the processing unit cause the processing unit to diminish sound signals corresponding to sounds having an angular displacement and a distance greater than stored values of angular displacement and distance, and to transmit the diminished sound signals via a data transmission module to the hearing aid device.

10. A system for enhanced hearing, comprising:
eyewear including:
 a first sound detector positioned on or adjacent a first lens of the eyewear;
 a second sound detector positioned on or adjacent a second lens of the eyewear; and
a hearing aid including:
 a processing unit in communication with the first and second sound detectors and storing software that includes instructions that when executed by the processing unit causes the processing unit to determine a time differential between detection of a sound by the first sound detector and detection of the same sound by the second sound detector; and to modify the amplitude of sound signals corresponding to each detected sound based on a stored value for a maximum time differential; and
 a data transmission module configured to transmit the modified sound signals to a speaker or other transducer.

11. Headwear comprising:
a first sound detector positioned on a first frontal side of the headwear;
a second sound detector positioned on a second frontal side of the headwear; and
a processing unit positioned on the headwear, in communication with the first and second sound detectors, and storing software that includes instructions that when executed by the processing unit causes the processing unit to determine a time differential between detection of a sound by the first sound detector and detection of the same sound by the second sound detector, and from the time differential determine an angular displacement from a forward direction for each detected sound, amplify each sound signal corresponding to the detected sound for which the determined angular displacement is less than a stored angular displacement value, diminish each sound signal corresponding to the detected sound for which the determined angular displacement is greater than the stored angular displacement value, and transmit the amplified and diminished sound signals to a speaker or hearing aid device.

12. The eyewear of claim 7, wherein the software instructions, when executed by the processing unit, cause the processing unit to determine the distance from the eyewear for each detected sound by determining a first time differential between detection of a sound by the first sound detector on the first lens and detection of the same sound by the second sound detector on the first lens, and determining a second time differential between detection of the same sound by the first sound detector on the second lens and detection of the same sound by the second sound detector on the second lens.

* * * * *